United States Patent
Lakin

(10) Patent No.: US 6,712,051 B1
(45) Date of Patent: Mar. 30, 2004

(54) METHOD FOR IMPROVING PART THROTTLE EFFICIENCY FOR SPARK IGNITION PISTON ENGINES BY PROVIDING A TEMPERATURE CONTROLLED SUPPLY OF HOT COMBUSTION AIR

(76) Inventor: Hubert William Lakin, 24 Meade Dr., Newport News, VA (US) 23602

( * ) Notice: Subject to any disclaimer, the term of this patent is extended or adjusted under 35 U.S.C. 154(b) by 0 days.

(21) Appl. No.: 10/306,957

(22) Filed: Dec. 2, 2002

(51) Int. Cl.[7] ............................................... F02M 31/00
(52) U.S. Cl. ........................................................ 123/556
(58) Field of Search ......................................... 123/556

(56) References Cited

U.S. PATENT DOCUMENTS

| | | | | |
|---|---|---|---|---|
| 4,249,500 A | * | 2/1981 | Behrendt et al. | 123/556 |
| 4,259,936 A | * | 4/1981 | Back et al. | 123/556 |
| 4,292,949 A | * | 10/1981 | Bendig | 123/556 |
| 4,430,981 A | * | 2/1984 | Thomas et al. | 123/556 |
| 4,526,156 A | * | 7/1985 | Briche | 123/556 |
| 4,545,357 A | * | 10/1985 | Kearsley et al. | 123/556 |
| 4,565,176 A | * | 1/1986 | Alf et al. | 123/556 |
| 4,632,084 A | * | 12/1986 | Eriksson | 123/556 |
| 5,046,473 A | * | 9/1991 | Hokenson | 123/556 |

* cited by examiner

*Primary Examiner*—Marguerite McMahon

(57) ABSTRACT

A system for improving part throttle efficiency of spark ignition piston engines by utilizing waste heat to increase the temperature of the combustion air is provided. The engine combustion air intake is provided with an ambient temperature air supply and a high temperature air supply. The high temperature supply is heated by engine coolant and or exhaust system waste heat. A computer controlled fuel injection system is required to regulate the temperature of the combustion air by mixing the two supplies based on the power output required. The fuel injection control system is also required to maintain correct fuel air ratios over the extended range of combustion air temperatures.

1 Claim, 5 Drawing Sheets

METHOD FOR IMPROVING PART THROTTLE EFFICIENCY FOR SPARK IGNITION PISTON ENGINES BY PROVIDING A TEMPERATURE CONTROLLED SUPPLY OF HOT COMBUSTION AIR

CROSS REFERENCE TO RELATED APPLICATIONS

U.S. Patent Documents

| U.S. Pat. Documents | | | |
|---|---|---|---|
| 4249500 | Feb. 10, 1981 | Behrendt | 123/556 |
| 4257380 | Mar. 24, 1981 | Bendig | 123/556 |
| 4259936 | Apr. 7, 1981 | Bach | 123/556 |
| 4262646 | Apr. 21, 1981 | Jones | 123/556 |
| 4273564 | Jun. 16, 1981 | Sugie | 123/556 |
| 4292949 | Oct. 6, 1981 | Bendig | 123/556 |
| 4295454 | Oct. 20, 1981 | Iida | 123/556 |
| 4365607 | Dec. 28, 1982 | Ishikawa | 123/556 |
| 4399774 | Aug. 23, 1983 | Tsutsumi | 123/556 |
| 4430981 | Feb. 14, 1984 | Thomas | 123/556 |
| 4501254 | Feb. 26, 1985 | Zellmer | 123/556 |
| 4520787 | Jun. 4, 1985 | Midorikawa | 123/556 |
| 4526156 | Jul. 2, 1985 | Briche | 123/556 |
| 4545357 | Oct. 8, 1985 | Kearsley | 123/556 |
| 4565176 | Jan. 21, 1986 | Alf | 123/556 |
| 4572147 | Feb. 25, 1986 | Gladstone | 123/556 |
| 4605837 | Aug. 12, 1986 | Chen | 123/556 |
| 4632084 | Dec. 30, 1986 | Eriksson | 123/556 |
| 4662341 | May 5, 1987 | Clement | 123/556 |
| 4665880 | May 19, 1987 | McWade | 123/556 |
| 4723527 | Feb. 9, 1988 | Panten | 123/556 |
| 4754742 | Jul. 5, 1988 | Young | 123/556 |
| 5040517 | Aug. 20, 1991 | Cox | 123/556 |
| 5046473 | Sept. 10, 1991 | Hokenson | 123/556 |
| 5076247 | Dec. 31, 1991 | Schmidt | 123/556 |
| 5076248 | Dec. 31. 1991 | Schatz | 123/556 |
| 5385132 | Jan. 31. 1995 | Lehman | 123/556 |
| 5404844 | Apr. 11, 1995 | Schechter | 123/556 |
| 5421307 | Jun. 6, 1995 | et all | 123/556 |
| 5899196 | May 4, 1999 | Chite | 123/556 |
| 5996560 | Dec. 7, 1999 | Schechter | 123/556 |
| 6102012 | Aug. 15, 2000 | Iiboshi | 123/556 |
| 5915366 | Jun. 29, 1999 | et all | 123/556 |
| 6314949 | Nov. 13, 2001 | DeGrazia Jr | 123/556 |
| 6341598 | Jan. 29, 2002 | Jessberger | 123/556 |

BACKGROUND OF INVENTION

The following discussion addresses automotive applications, as this is the field in which significant improvements in efficiency may be realized by the described invention. The average automobile engine only achieves its maximum power rating when accelerating at the maximum obtainable rate, traveling uphill at a high rate of speed or traveling at maximum obtainable speed. Since most vehicle operation requires only a fractional portion of available engine power part throttle efficiency becomes a major factor in the fuel economy experienced by the average automobile. Part throttle efficiency is not as significant for vehicles with a low power to weight ratio such as medium and large trucks or severely underpowered smaller vehicles. Increasing part throttle efficiency has recently become a more desirable goal for automobile producers with production of higher-powered vehicles trending upwards and the possibility of increases in legislated fuel mileage standards.

Heating of combustion air for spark ignition engines has been employed in the past in a limited manner. Combustion air has been heated by contact with a shrouded exhaust manifold and supplied to the engine by admittance to the engine air filter as controlled by a thermostat. The purpose of this arrangement was to provide heated air during cold engine and cold ambient conditions to aid in fuel vaporization and provide air at temperatures closer to that of those experienced at normal operation. Also carburetor-icing phenomenon were less likely to occur with this system. Additionally intake manifold heating by either exhaust gases or engine coolant have been used with the primary purpose of aiding fuel vaporization. Combustion air heating also occurs as a result of intake manifold heating. These methods were used with carbureted engines, which did not have provisions for maintaining the optimum fuel air ratios when intake air density changed due to changes in temperature or atmospheric pressure.

The disadvantage to combustion air heating is that the density of the incoming air will be reduced with a resultant reduction in the maximum available power. For this reason current automotive practice is to obtain combustion air in front of the vehicles radiator, which provides the coolest, air obtainable. Adequate fuel vaporization is obtained with the cooler air by injecting the fuel at each intake port relying on the fuel injector and heat transfer from the cylinder head as well as heat introduced by exhaust gas re-circulation.

This invention provides a method of improving efficiency by controlling combustion air temperatures based on power demand to achieve maximum efficiency. Control is by integrating combustion air temperature control with the other engine management functions. Existing patents are discussed below as to their purpose and relevance to this invention. Since this invention does not deal with the specific details of the devices required the following discussion is based on the objectives of the previous inventions.

Patents that provide heated combustion air for engine starting and subsequent warm up are not listed or discussed, as their primary objectives are significantly different than that of this invention.

Patents that apply to methods for heating combustion air to preclude icing or condensation phenomena are not listed or discussed for the same reason. Additionally patents that provide an electrically controlled manifold "hot spot" are not discussed as they are considered a refinement of the manifold heating processes discussed above.

Numerous patents have been issued which deal with the process of providing heated air to the engine at a relatively constant temperature as discussed above. Some of these inventions also provide a means of providing cooler ambient air when the cool air is desirable for maximum power output. These inventions were thermostatically controlled by a mechanical or electrical means to provide an optimum temperature for a predetermined engine temperature and predetermined fuel addition capability. These patents are considered improvements or variations of the combustion air heating method described above and include U.S. Pat. No. 4,249,500 (Behrendt) and others listed in the Cross Reference to Related Patents Listing that are not specifically addressed below.

U.S. Pat. No. 4,545,357(Kearsly) describes a programmable temperature control system for combustion air. That patent provides temperature control but does not provide for integration with fuel delivery and other control parameters that require adjustment as combustion air temperatures are widely varied.

U.S. Pat. No. 4,723,527(Panten) utilizes controlled combustion air temperatures. It comprises a 2-stage control system coupled with controlled EGR valve operation.

U.S. Pat. Nos. 5,076,248(Schutz), 5,404,844(Schechter) and 5,996,560(Schechter) contain provisions for providing heated combustion air during part throttle operation. The heated air is provided primarily as an aid in maintaining stable combustion when variable valve timing changes are implemented in these applications.

BRIEF SUMMARY OF THE INVENTION

Spark ignition engines suffer a loss of efficiency during part throttle operation due to pumping losses created by the high vacuum conditions existing in the engine cylinder during the intake stroke. Some of this loss may be eliminated by heating the combustion air to a high temperature. Since a higher volume of the hotter less dense air is required to produce the same power output a larger throttle opening with a resultant lower manifold vacuum would result in a reduction of pumping losses. Efficiency gains would also be achieved by recycling waste heat thru the compression/combustion expansion process resulting in an increase in thermal efficiency. Heating the combustion air can also result in improved fuel vaporization and combustion stability.

The advantages would be achieved by heating ambient air to a high temperature utilizing engine produced waste heat and mixing the hot air with ambient air to create a controlled temperature combustion air supply. The amount of ambient air mixed with the heated air would vary from little or none at low throttle demand to 100% ambient at full throttle demand. The high temperature combustion air system would be controlled by the fuel management computer programmed to provide the hottest possible combustion air temperature based on power demand, engine pre-ignition or detonation limits and pollution (primarily nitrogen compounds) limits.

The additional components necessary to achieve the objectives would consist of heat exchanger(s), a mixing valve with operator, additional temperature sensors and necessary ducting. Current fuel management controls would require extended capabilities to manage combustion air temperature as well as manage fuel delivery over the extended range of combustion air density.

Additionally a throttle by wire feature and hot air dump valve with a circulation fan are desirable. The throttle by wire feature is currently used in some automotive applications and is desirable to prevent exceeding system response rates and to maintain engine power in accordance with operator demand during transit conditions. A hot air dump valve located downstream of the combustion air heat exchangers is desirable to maintain the hot air supply at a relatively constant temperature. A fan to maintain air circulation thru the heat exchanger when induced airflow (by vehicle movement) is not sufficient is required to ensure air temperature control is maintained. The fan may be the normal radiator cooling fan or a separate fan. Control of the dump valve and fan would be by the engine management system or directly by thermostatic controls.

DETAILED DESCRIPTION

Figure 1:
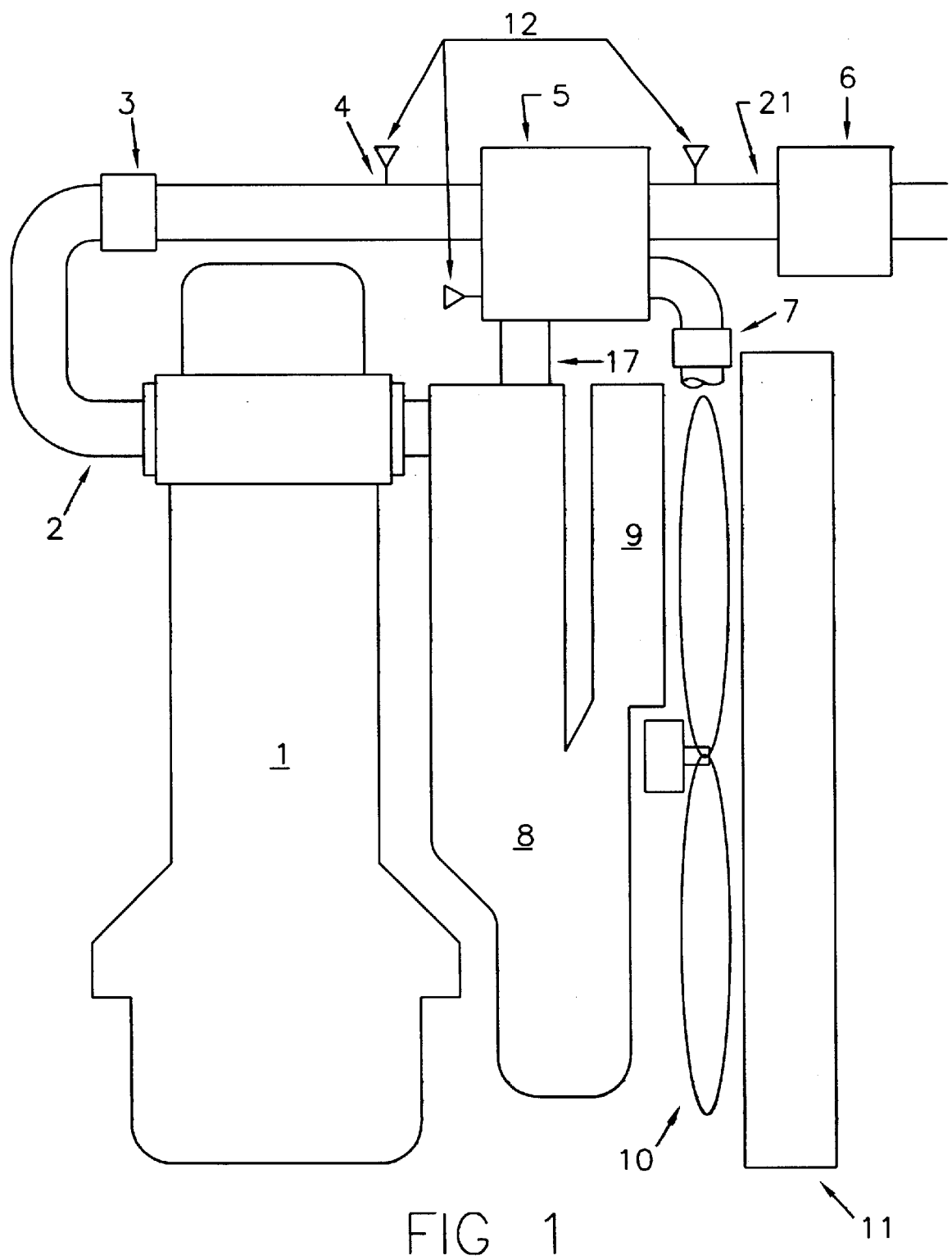
FIG. 1 shows the layout of an automotive application with a traverse mounted inline engine. The basic mechanical, elements involved to achieve temperature control and supply high temperature combustion air are identified.
Figure 2A:
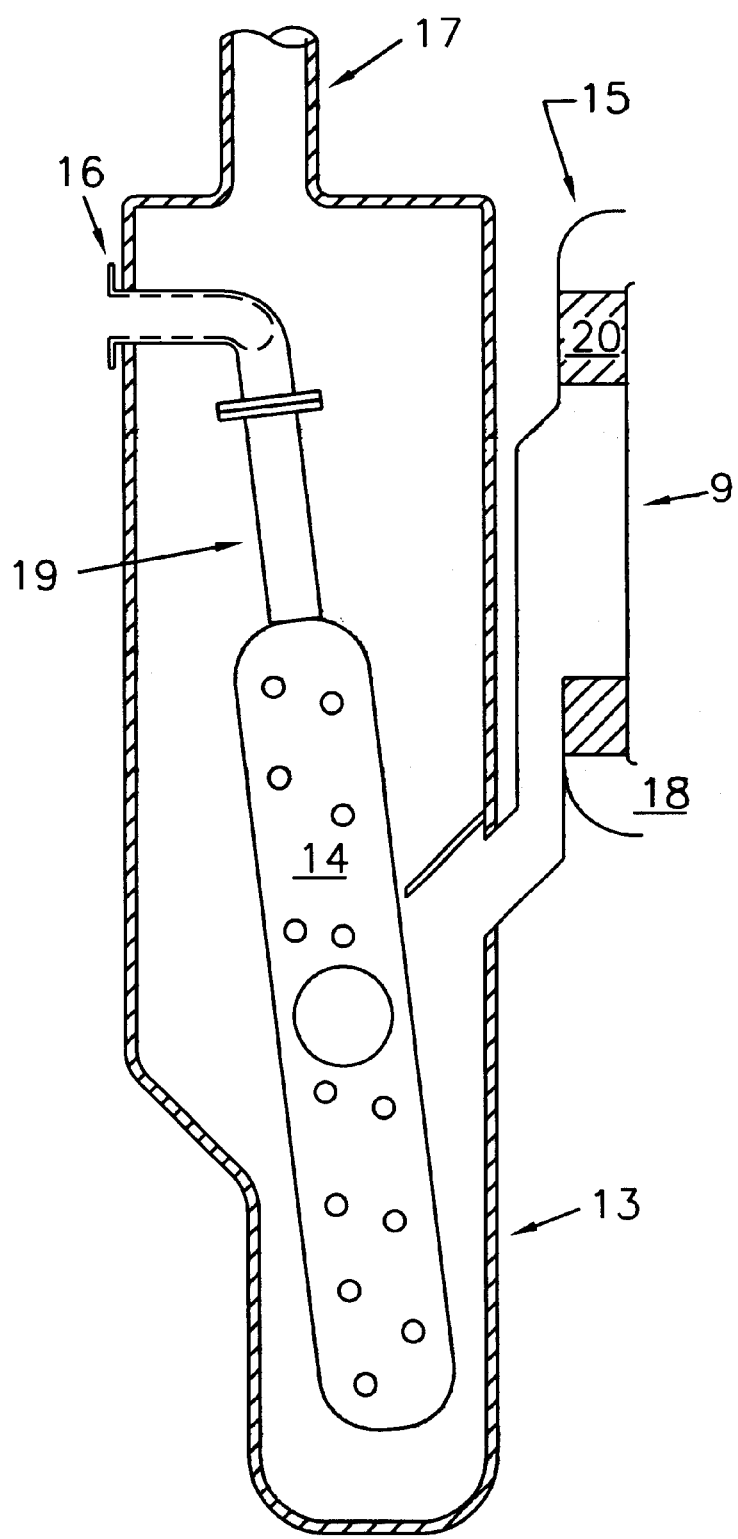
FIG. 2A is a cross sectional view of a basic heat exchanger configuration for heating combustion air to high temperatures that is compatible with the FIG. 1 layout.
Figure 2B:
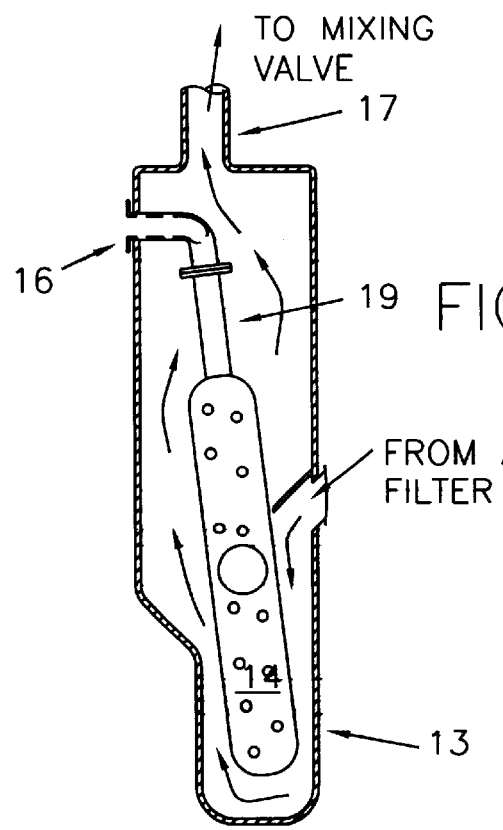
FIG. 2B shows a representation of combustion airflow through the heat exchanger shown in FIG. 2A.
Figure 2C:
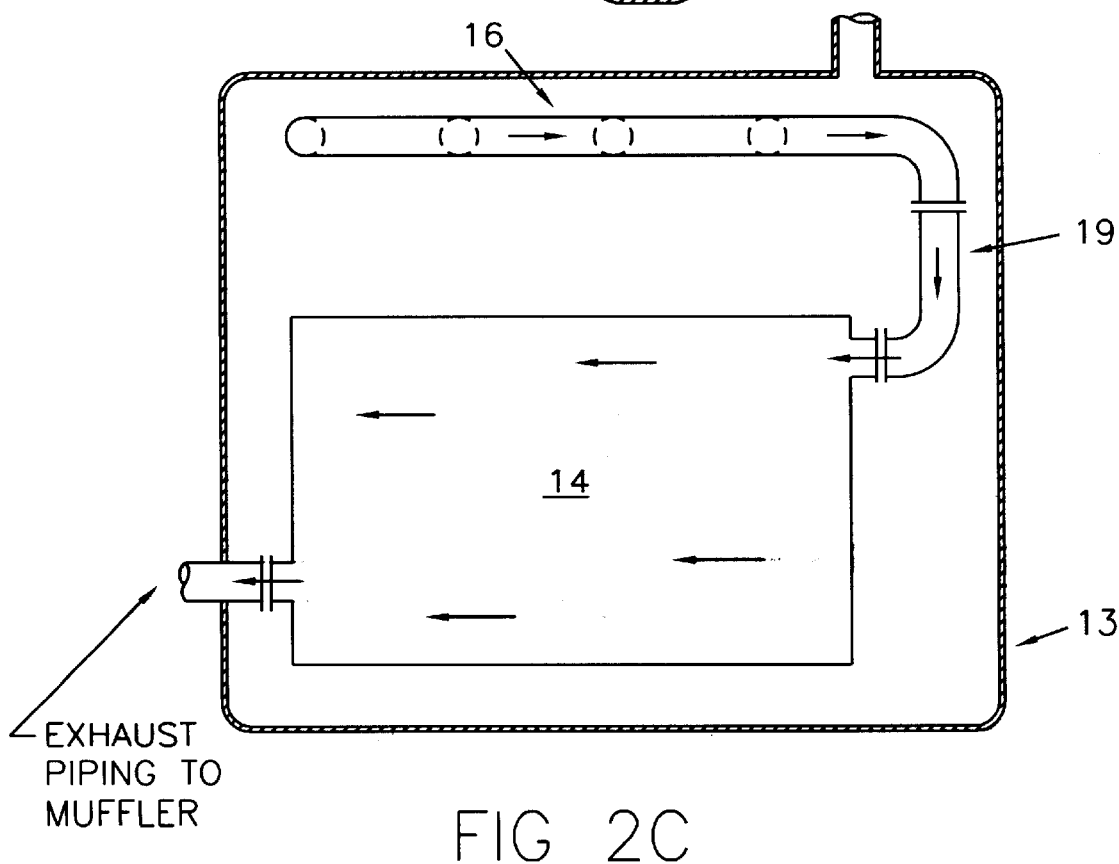
FIG. 2C shows a representation of exhaust system flow through the heat exchanger shown in FIG. 2A.
Figure 3:
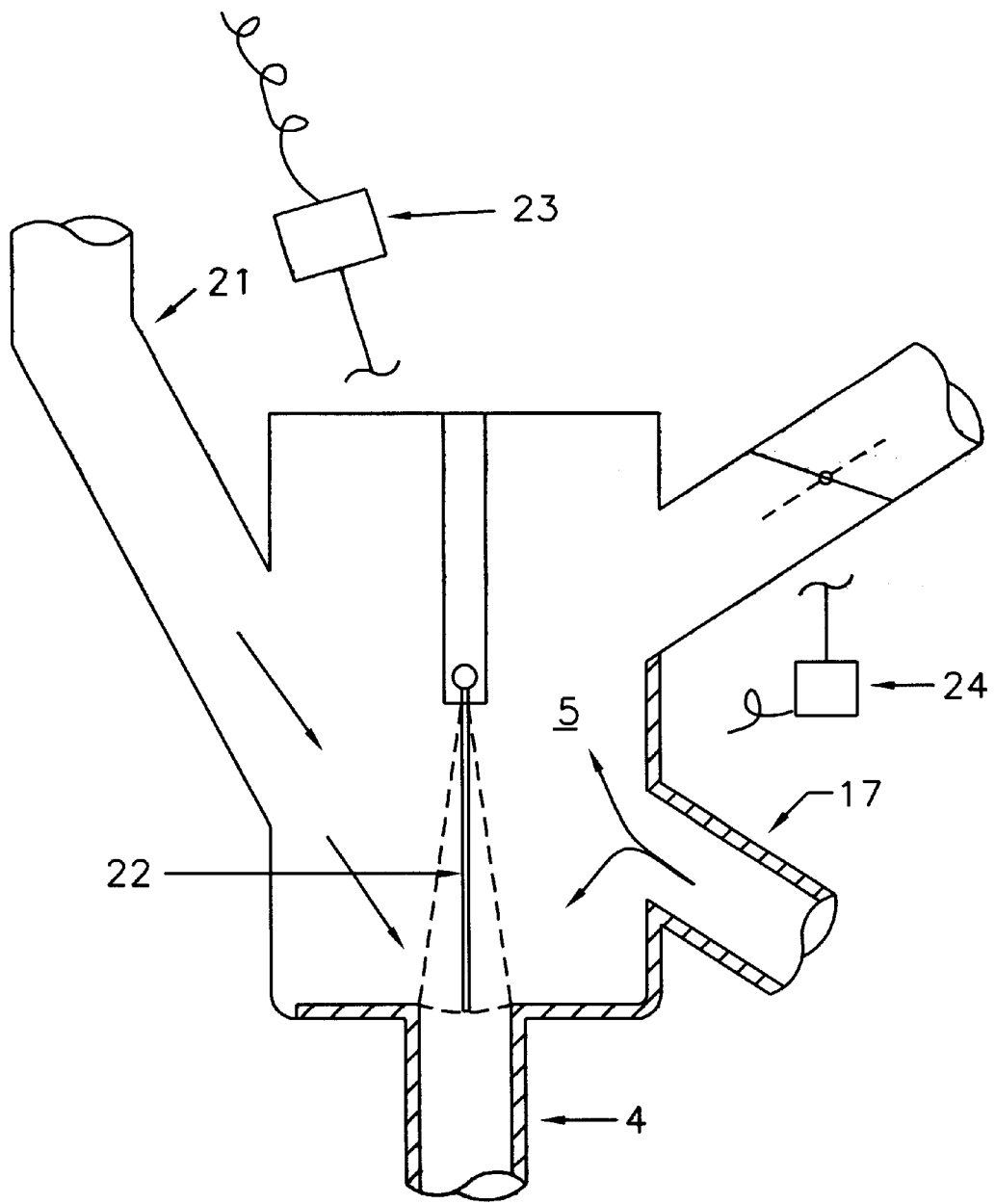
FIG. 3 is a cross sectional view of a typical mixing valve and dump valve arrangement used to control combustion air temperatures.

The numbers that identify the various components represented on FIGS. 1 thru 3 are used to identify the same component throughout. The representation shown on the figures represents a typical installation of the invention in a motor vehicle. The various components are not shown in great detail, as an infinite number of configurations are possible to achieve the process claimed by the invention. Additionally the process would benefit any spark ignition engine installation that operated at part throttle during a significant portion of its duty cycle.

FIG. 1 shows components that are unchanged and the additional components required to implement the invention. Unchanged components are the engine 1, the air filter (ambient air temperature) 6, the electrically powered engine-cooling fan 10, the radiator 11 and filtered air intake ducting 21. Components that may require some modification are the intake manifold 2 and the throttling and mass airflow sensing provisions 3. Additional components are an additional air filter (air heated by passing over the radiator) 9, exhaust/combustion air heat exchanger 8, mixing valve 5, dump valve 7, heated air ducting 17, controlled temperature air ducting 4 and additional temperature sensors (ambient, hot air and mixed air) 12.

FIG. 2A is a cross section of the heat exchanger 8 and air filter 9 shown on FIG. 1. Items shown on this figure are the heated air ducting 17, engine exhaust manifold 16, exhaust head pipe 19, catalytic converter 14, heat exchanger housing 13 and the preheated air filter consisting of the filter housing 15, air intake passages 18 and filter media 20. The heat exchanger housing 13 is insulated to achieve the high combustion air temperatures desired and is shown cross-hatched. The un-insulated air filter 9 is shown as a single line outline.

FIG. 2B and 2C depict the heated airflow and exhaust paths in the heat exchanger in sectional views of the FIG. 2A heat exchanger.

FIG. 3 is a cross section of a typical mixing valve. A flapper valve is shown with the flapper 22 in the mid position with the travel range indicated by dotted lines. A hot air dump valve is also illustrated and is shown as a butterfly valve in the closed position with the open position represented by a dotted line. Flow arrows show the direction of airflows. Insulated portions of the valve are shown as crosshatched with the un-insulated portions shown as a single line outline. Operation of the valves is by the mixing valve operator 23 and dump valve operator 24.

The degree of combustion air heating that may be used will vary with each specific engine design. The depiction of the invention as represented on FIG. 1 assumes that the engine design will tolerate a high degree of combustion air heating when operated at part throttle.

The primary sources of available heat that may be utilized for combustion air heating are the engine coolant radiator, and exhaust system components specifically the exhaust manifold, head pipe and catalytic converter. All of these components are used to increase combustion air temperature in the FIG. 1 depiction. This however does not exclude using one or any combination of two or more of these components to achieve the temperatures that would be useful in a particular application.

Combustion air heating is accomplished in the FIG. 1 example by:

1. Obtaining warm air preheated by the engine-cooling radiator. This is accomplished by placing and air filter directly behind the engine radiator-cooling fan to obtain heated air.
2. Directing the filtered preheated air to a heat exchanger that uses portions of the exhaust manifold, the head pipe and the catalytic converter as the heat sources. This locates the catalytic converter in front of the engine to minimize-the physical size of the heat exchanger. The hot exhaust components are not shown with fins or any other methods of increasing surface area, which would improve heat transfer. Increasing heat transfer by increasing the heat transfer efficiency would be used if the particular application would benefit from more complex heat transfer components.

Hot combustion air and ambient combustion air are directed to the mixing valve where they are mixed in proportions as determined by the engine management computer. The resultant mixed air temperature is based on operator power demand and is as determined by programmed parameters. The combustion air is then directed to the air/fuel induction system. The mixing valve shown in FIG. 3 is shown as a flapper valve. Other types of valves that are suitable for mixing the two air streams could also be used.

To maintain a relatively stable hot air temperature a hot air dump valve may be used to maintain airflow thru the heat exchanger when flow is not the volume necessary to prevent an increasing hot air temperature. Suitable valve types other than a butterfly may be used for this purpose. To ensure adequate heat exchanger airflow is available when vehicle speed is low fan operation may be required. In the FIG. 1 version the engine-cooling fan would be used for this purpose. An auxiliary fan located in the dump valve air stream could also be used for this purpose. Fan operation control would be by the engine management computer or by thermostatic switch.

To achieve and maintain the high combustion air temperatures required to maximize part throttle engine efficiency insulation on the heat exchanger and downstream hot air components is desirable. Combustion air ducting and manifolding downstream of the mixing valve should be constructed of materials that have a low heat sink effect to aid in maintaining the desired combustion air temperature during transient conditions.

Figure 4:
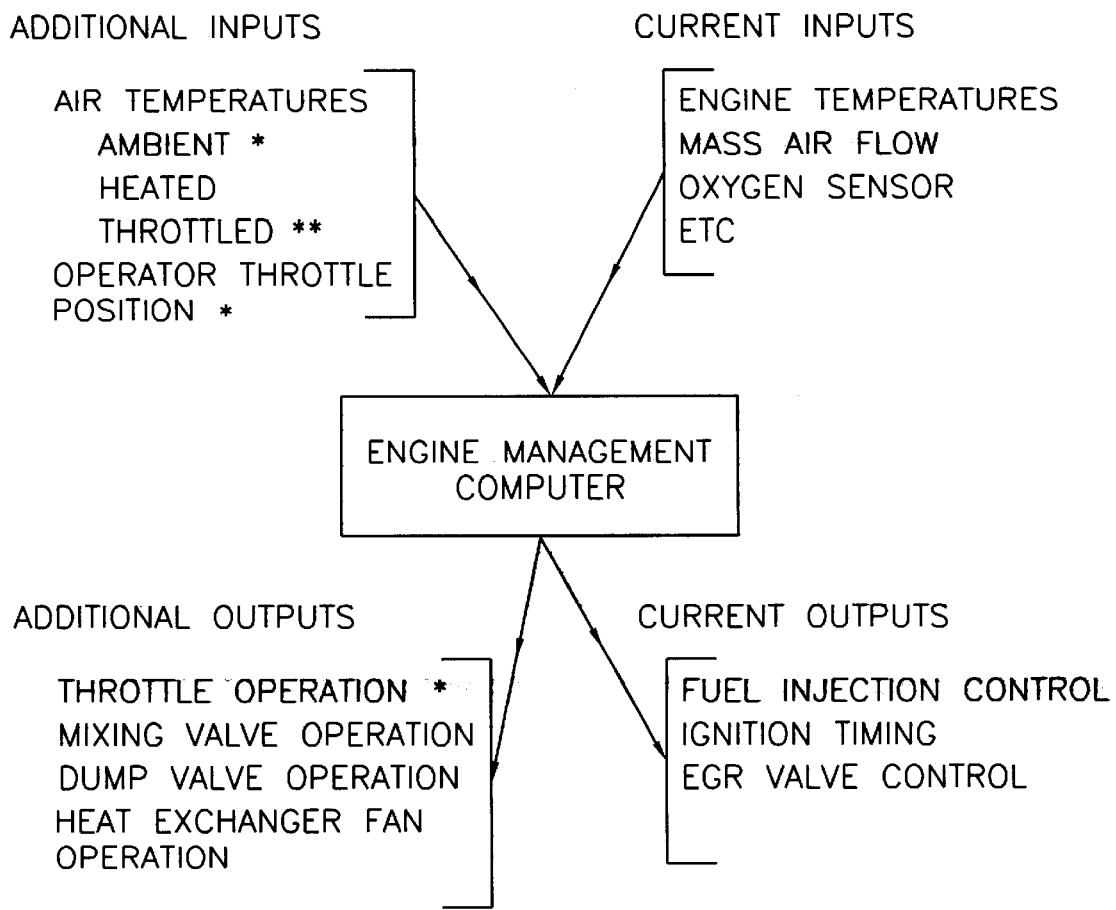
FIG. 4 is a listing of the additional monitoring and control functions required to manage and optimize combustion air temperature.

FIG. 4 illustrates additional monitoring and control functions that are required to implement the invention. Generally speaking the engine management computer in the modern automobile monitors various engine parameters and provides the necessary control functions to inject the correct amount of fuel, adjust the ignition timing and adjust the quantity of exhaust gas re-circulation. The computer is programmed to maximize efficiency while maintaining undesirable exhaust emissions within limits. To implement delivery of hot combustion air during part throttle operation control of the mixing valve by the engine management computer is required, Additionally since the actual throttle position will be further open because of the lower air density when hot combustion air is being delivered to the engine, control of the actual throttle valve by the computer is desirable. The operation of the throttle by the driver would be represented to the computer by analog or digital signal as the desired throttle position. Operation of the hot air dump valve would be by the computer to maintain hot air temperatures relatively constant thus reducing "hunting" by the control functions during transient conditions or overheating of exhaust components within the heat exchanger. The computer in order to aid in implementing the control functions would monitor additional air temperatures. The programming for the computer would also be required to perform its current functions while operating within the extended range of combustion air temperatures. Default programming to accommodate rapid power level changes may be necessary to achieve satisfactory system response. Default values would only be used during the transit time period. It is also noted that a significant reduction in the amount of exhaust gas that is re-circulated could be required since the hot combustion air will replace the heating effect now obtained from re-circulating exhaust gas.

The above description is considered an embodiment of the claimed invention, which will provide satisfactory performance and achieve the objectives of the invention. It is considered that many variables may be employed within the claimed scope of this invention.

I claim:

1. A combustion air supply system employing temperature control of heated combustion air during spark ignition piston engine operation comprising:

Means for heating combustion air to elevate combustion air temperatures to temperatures in excess of 125 degrees Fahrenheit and up to a maximum of 1000 degrees Fahrenheit using waste engine heat obtained from engine coolant and or from heat exchange components located so as to utilize the exhaust system of the engine as a source of heat;

Means for mixing the heated combustion air with ambient combustion air; and

Means for controlling the mixing of the two air streams to provide temperature controlled combustion air to the engine within a range of existing ambient up to 1000 degrees Fahrenheit, said means for controlling being integrated with the engine management functions so as to control fuel addition and other functions in a manner that provides the ability for engine operation over the extended range of combustion air temperatures for the purpose of maximizing engine efficiency during part load engine operations wherein the exhaust heated combustion air supply contains a hot air dump valve and means for providing air circulation through the exhaust heated combustion air heat exchanger with the required dump valve control mechanisms necessary to provide for limiting the maximum temperature of the controlled hot combustion air supply flowing through the heat exchanger.

* * * * *